United States Patent
Hoffmann et al.

(10) Patent No.: US 10,363,790 B2
(45) Date of Patent: Jul. 30, 2019

(54) DEVICE AND METHOD FOR PROACTIVE CONTROL OF A VIBRATION DAMPING SYSTEM OF A VEHICLE

(71) Applicant: FORD GLOBAL TECHNOLOGIES, LLC, Dearborn, MI (US)

(72) Inventors: Uwe Hoffmann, Leverkusen (DE); Martin Saeger, Pulheim (DE); Toni Kymaelaeinen, Hyvinkää (FI); Michael Seemann, Köln (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/246,793

(22) Filed: Apr. 7, 2014

(65) Prior Publication Data

US 2014/0303844 A1    Oct. 9, 2014

(30) Foreign Application Priority Data

Apr. 8, 2013 (DE) .................. 10 2013 206 109

(51) Int. Cl.
*B60G 23/00* (2006.01)
*G06F 7/00* (2006.01)
(Continued)

(52) U.S. Cl.
CPC ....... *B60G 17/0165* (2013.01); *B60G 17/019* (2013.01); *B60G 17/02* (2013.01);
(Continued)

(58) Field of Classification Search
CPC ................ B60G 17/0165; B60G 17/02; B60G 2400/821; B60G 2500/10
(Continued)

(56) References Cited

U.S. PATENT DOCUMENTS

| 4,657,280 A | 4/1987 | Ohmori |
| 4,674,767 A * | 6/1987 | Kuroki ............... B60G 17/0165 |
| | | 267/64.16 |

(Continued)

FOREIGN PATENT DOCUMENTS

| DE | 4119494 A1 | 1/1992 |
| DE | 4117091 A1 | 11/1992 |

(Continued)

OTHER PUBLICATIONS

Examination Report issued in corresponding German Patent Application No. 10 2013 206 109.9, dated Jan. 7, 2014.

(Continued)

*Primary Examiner* — Khoi H Tran
*Assistant Examiner* — Jorge O Peche
(74) *Attorney, Agent, or Firm* — Jones Robb, PLLC; Raymond Coppiellie (57) ABSTRACT

A vehicle can have a vibration damping system, which has a characteristic curve that is adjustable. To control the characteristic curve of the vibration damping system, information regarding a profile of a road surface in front of the vehicle is detected. At least a portion of the road surface profile can be classified according to a change in height and a length of the portion. The classification can be based on the detected information. Based on the classification of the road surface profile, the characteristic curve of the vibration damping system of the vehicle can be adjusted.

23 Claims, 5 Drawing Sheets

(51) Int. Cl.
  *B60G 17/0165* (2006.01)
  *B60G 17/019* (2006.01)
  *B60G 17/02* (2006.01)
  *B60G 17/08* (2006.01)

(52) U.S. Cl.
  CPC .......... *B60G 17/08* (2013.01); *B60G 2400/82* (2013.01); *B60G 2400/821* (2013.01); *B60G 2500/10* (2013.01); *B60G 2500/20* (2013.01)

(58) Field of Classification Search
  USPC ............ 701/37, 38; 280/5.515, 5.517, 5.518, 280/5.519
  See application file for complete search history.

(56) References Cited

U.S. PATENT DOCUMENTS

| | | | |
|---|---|---|---|
| 4,696,489 A * | 9/1987 | Fujishiro | B60G 17/018 280/5.507 |
| 4,714,271 A * | 12/1987 | Buma | B60G 17/0165 280/5.503 |
| 4,717,173 A * | 1/1988 | Sugasawa | B60G 17/0165 280/5.511 |
| 4,728,120 A * | 3/1988 | Buma | B60G 17/0165 280/5.519 |
| 4,733,883 A | 3/1988 | Sugasawa et al. | |
| 4,744,589 A * | 5/1988 | Buma | B60G 17/0165 280/5.514 |
| 4,749,210 A * | 6/1988 | Sugasawa | B60G 17/0165 280/124.102 |
| 4,770,438 A * | 9/1988 | Sugasawa | B60G 17/0165 180/169 |
| 4,861,067 A * | 8/1989 | Booher | B60G 3/10 280/5.515 |
| 4,899,296 A * | 2/1990 | Khattak | G01B 11/16 348/148 |
| 4,936,604 A | 6/1990 | Kawagoe et al. | |
| 5,016,908 A * | 5/1991 | Athanas | B60G 17/018 188/266.5 |
| 5,058,017 A | 10/1991 | Adachi et al. | |
| 5,067,687 A * | 11/1991 | Patel | B60T 8/3665 137/454.5 |
| 5,123,671 A * | 6/1992 | Driessen | B60G 17/018 188/266.5 |
| 5,163,319 A | 11/1992 | Spies et al. | |
| 5,193,844 A * | 3/1993 | Butsuen | B60G 17/08 188/266.4 |
| 5,203,584 A * | 4/1993 | Butsuen | B60G 17/0165 280/124.102 |
| 5,269,557 A * | 12/1993 | Butsuen | B60G 17/015 188/266.4 |
| 5,347,457 A * | 9/1994 | Tanaka | B60G 17/0164 280/5.514 |
| 5,444,621 A * | 8/1995 | Matsunaga | B60G 17/0165 280/5.518 |
| 5,450,322 A * | 9/1995 | Tanaka | B60G 17/0165 280/5.518 |
| 5,671,142 A * | 9/1997 | Tatarazako | B60G 17/0152 280/6.159 |
| 6,019,495 A | 2/2000 | Yamada et al. | |
| 6,122,578 A * | 9/2000 | Knolle | B60G 17/0152 180/164 |
| 6,233,510 B1 * | 5/2001 | Platner | B60G 13/16 382/104 |
| 6,385,529 B1 | 5/2002 | Minowa et al. | |
| 6,456,194 B1 * | 9/2002 | Carlson | B60G 17/0165 340/440 |
| 7,587,267 B2 | 9/2009 | Mori et al. | |
| 7,909,417 B2 * | 3/2011 | Wang | B60T 8/1755 303/177 |
| 8,311,734 B2 | 11/2012 | Georgis et al. | |
| 8,451,140 B2 | 5/2013 | Piccinini et al. | |
| 8,630,795 B2 | 1/2014 | Breed et al. | |
| 8,892,304 B2 | 11/2014 | Lu et al. | |
| 9,008,858 B1 | 4/2015 | Payne et al. | |
| 9,626,763 B1 * | 4/2017 | Hoye | B60R 1/10 |
| 2004/0012162 A1 | 1/2004 | Burke | |
| 2004/0064240 A1 | 4/2004 | Sugano | |
| 2005/0209742 A1 | 9/2005 | Sakakihbara et al. | |
| 2005/0218718 A1 | 10/2005 | Iwatsuki et al. | |
| 2006/0064223 A1 | 3/2006 | Darrell | |
| 2006/0074533 A1 * | 4/2006 | Karaba | B60G 17/0152 701/37 |
| 2006/0215020 A1 * | 9/2006 | Mori | B60R 1/00 348/119 |
| 2006/0243548 A1 * | 11/2006 | Stein | B60G 17/08 188/266.1 |
| 2007/0088464 A1 | 4/2007 | Coates | |
| 2007/0217433 A1 | 9/2007 | Klaus et al. | |
| 2008/0015743 A1 | 1/2008 | Haug | |
| 2008/0079280 A1 * | 4/2008 | Nakamura | B60G 17/0485 296/35.3 |
| 2008/0133066 A1 | 6/2008 | Toru | |
| 2008/0275606 A1 | 11/2008 | Nicolai et al. | |
| 2009/0043452 A1 * | 2/2009 | Sekiya | B60G 17/0165 701/40 |
| 2009/0088918 A1 | 4/2009 | Toru et al. | |
| 2009/0097038 A1 * | 4/2009 | Higgins-Luthman | B60G 17/019 356/602 |
| 2009/0105921 A1 | 4/2009 | Hanatsuka et al. | |
| 2009/0287368 A1 | 11/2009 | Bonne | |
| 2009/0299857 A1 * | 12/2009 | Brubaker | G06Q 30/02 705/14.66 |
| 2010/0042292 A1 | 2/2010 | Schindler et al. | |
| 2010/0082216 A1 | 4/2010 | Yasui et al. | |
| 2010/0138108 A1 * | 6/2010 | Kajino | B60G 17/016 701/38 |
| 2011/0084503 A1 | 4/2011 | Li et al. | |
| 2011/0137508 A1 | 6/2011 | Garcia Manchado | |
| 2012/0316746 A1 | 12/2012 | Park | |
| 2013/0103259 A1 * | 4/2013 | Eng | B60G 17/019 701/37 |
| 2013/0345933 A1 * | 12/2013 | Norton | B60G 17/018 701/37 |
| 2014/0163837 A1 | 6/2014 | Um et al. | |
| 2014/0195112 A1 * | 7/2014 | Lu | B60G 17/015 701/37 |
| 2014/0195114 A1 | 7/2014 | Tseng | |
| 2015/0046084 A1 | 2/2015 | Choi et al. | |
| 2015/0088378 A1 | 3/2015 | Sugai et al. | |
| 2015/0166072 A1 | 6/2015 | Powers et al. | |
| 2015/0246672 A1 | 9/2015 | Pilutti et al. | |
| 2015/0274028 A1 | 10/2015 | Payne et al. | |
| 2015/0274030 A1 | 10/2015 | Payne et al. | |
| 2016/0144861 A1 | 5/2016 | Cao et al. | |
| 2017/0106855 A1 * | 4/2017 | Lavoie | B60W 10/184 |
| 2018/0068495 A1 * | 3/2018 | Chainer | G07C 5/008 |
| 2018/0186210 A1 * | 7/2018 | Noll | B60G 17/0165 |
| 2018/0194286 A1 * | 7/2018 | Stein | B60W 10/18 |

FOREIGN PATENT DOCUMENTS

| | | |
|---|---|---|
| DE | 102006039353 A1 | 3/2008 |
| DE | 102009009063 A1 | 10/2009 |
| DE | 102008032545 A1 | 1/2010 |
| DE | 102009021107 A1 | 11/2010 |
| DE | 102010029947 A1 | 12/2011 |
| DE | 102010044263 A1 | 3/2012 |
| KR | 20130000125 A | 1/2013 |
| WO | WO 89/04498 A1 | 5/1989 |

OTHER PUBLICATIONS

Ramsundar K. Ganesan, et al., "An Image Processing Approach to Detect Obstacles on Road", SAE International, published Jan. 14, 2015, 7 pgs.

Hua-Tsung Chen, et al.; "Vision-Based Road Bump Detection Using a Front-Mounted Car Camcorder", 2014 22nd International (56) References Cited

OTHER PUBLICATIONS

Conference on Pattern Recognition, IEEE Computer Society, pp. 4537-4542.
Non-Final Rejection dated Nov. 25, 2016 from U.S. Appl. No. 14/887,934.
Erick Michael Lavoie et al. "Systems and Methods for Abrupt Road Change Assist and Active Suspension Control" U.S. Appl. No. 14/887,934, filed Oct. 20, 2015.
Non-Final Office Action dated May 9, 2016 from related U.S. Appl. No. 14/678,756.
Final Office Action dated Nov. 28, 2016 from related U.S. Appl. No. 14/678,756.
Examination Report dated Mar. 12, 2014 from corresponding German Patent Application No. 10 2014 206 481.3.
Notice of Allowance dated May 2, 2018 in U.S. Appl. No. 14/887,934.
Final Office Action dated Feb. 7, 2018 in U.S. Appl. No. 14/887,934.
Non Final Office Action dated Sep. 26, 2017 in U.S. Appl. No. 14/887,934.
Advisory Action dated Jul. 24, 2017 in U.S. Appl. No. 14/887,934.
Final Office Action dated Mar. 8, 2017 in U.S. Appl. No. 14/887,934.
Non Final Office Action dated Apr. 26, 2017 in U.S. Appl. No. 14/678,756.
Advisory Action dated Nov. 1, 2017 in U.S. Appl. No. 14/678,756.
Non Final Office Action dated May 9, 2018 in U.S. Appl. No. 14/678,756.
Office Action dated May 21, 2018 in CN Appln No. 201510160718.1.

* cited by examiner

DEVICE AND METHOD FOR PROACTIVE CONTROL OF A VIBRATION DAMPING SYSTEM OF A VEHICLE

CROSS REFERENCE TO RELATED APPLICATIONS

This application claims priority to German Application No. 102013206109.9, filed on Apr. 8, 2013, the entire content of which is incorporated by reference herein.

TECHNICAL FIELD

The present disclosure relates generally to vehicle suspension systems, and more particularly, to proactive control of a vibration damping system of a vehicle.

BACKGROUND

The body of a vehicle and its unsprung mass form a vibration system. In order to improve the ride comfort and to achieve stable roadholding, vertical vibrations of the vibration system at each corner of the vehicle (i.e., at the wheels) are damped using one or more vibration damping systems. For example, passive, semi-active, or active damping systems can be used in this context. In actively and semi-actively controlled damping systems, the movement of the vehicle body and/or the wheels caused by variations in the road surface can be measured using acceleration sensors and/or position sensors (e.g., displacement sensors), which can be disposed on the vehicle body and/or on the wheels. The damping system can be controlled to respond to the movement of the vehicle body or the wheels using information about the road surface based on the measured movements. Thus, the damping system can react to accommodate changes in the road surface, albeit with a certain delay.

With this in mind, the object of the present disclosure is to provide a method for pro-actively controlling a vibration damping system of a vehicle.

SUMMARY

In accordance with various exemplary embodiments, the present disclosure provides a method for controlling a vibration damping system of a vehicle. The vibration damping system can have a characteristic curve that is variably adjustable. The method can include detecting information regarding a profile of a road surface in front of the vehicle, and classifying at least a portion of the road surface profile according to a change in height and a length of the portion based on the detected information. The method can further include adjusting the characteristic curve of the damping system based on the classification of the road surface profile.

The present disclosure also provides a vehicle vibration damping system comprising a detection unit, a classification unit, and an activator. The detection unit can be configured to detect information about a profile of a road surface in front of a vehicle. The classification unit can be operatively coupled to the detection unit and configured to classify at least a portion of the road surface profile based on detected height or length features of the profile. The activator can be configured to adjust damping responsively to the classification of the road surface profile.

The present disclosure further provides a vehicle vibration damping system comprising a control unit. The control unit can be operatively coupled to a variable damping system. The control unit can be configured to receive signals regarding detection of height or length features of a profile of a road surface in front of a vehicle. The control unit can also be configured to classify at least a portion of the road surface profile based on the detected height or length features of the profile. The control unit can be further configured to modify damping responsively to the classification of the road surface profile.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, an advantageous method and a corresponding device and vehicle are provided for controlling a damping system that reduces or minimizes response delay.

In one or more disclosed embodiments, a vibration damping system of a vehicle comprises at least one spring element and/or damping element. A characteristic curve of the spring element and/or the damping element can be variably adjustable. The vibration damping system can be an active or semi-active vibration damping system. Initially, information is recorded about the profile of the surface of the highway (e.g., the road) in front of the vehicle in the respective direction of travel. The characteristic curve of the at least one spring element and/or the damping element can then be adjusted based on the recorded information.

By recording data or information about the oncoming road surface, proactive control of the vibration damping system is possible and the response delay in controlling the vibration damping system of the vehicle can be minimized or at least reduced. Further, the proactive control can account for any lag or transition time needed by the vibration damping system to adjust between damping settings such that the vibration damping system can switch to the desired setting for a particular road event (e.g., a pothole, bump, or any other vertical deviation) before the wheel actually encounters the road event, or at least as the wheel encounters the road event. Road handling and comfort may thus be improved over purely reactive systems, where the vibration damping system is adjusted only in response to the wheel encountering the road event. The recording and use of additional information or data about the highway or road profile in front of the respective vehicle as disclosed herein thus represents a fundamental improvement over existing vibration damping systems, especially semi-active vibration damping systems.

In one or more embodiments, the at least one spring element and/or damping element can be designed such that its characteristic curve can be variably adjusted between at least two different characteristic curves, for example, a first characteristic curve that results in a hard suspension and a second characteristic curve that results in a soft suspension or a relatively softer suspension as compared to the first characteristic curve. Based on the recorded information, the characteristic curve of the at least one spring element and/or damping element can be adjusted before or just when the vehicle reaches the position of the surface of the highway (e.g., the road) corresponding to the recorded information. The monitored profile of the surface of the ground can be the vertical profile (e.g., a profile in the x-z plane, wherein the z axis indicates the vertical axis and the x axis indicates the horizontal axis pointing in the direction of travel). Of course, the vibration damping system may also be configured to switch between more than two different characteristic curves according to one or more contemplated embodiments.

In one or more embodiments, the profile of the road surface at a certain distance in front of the vehicle (i.e., oncoming in a direction of travel of the vehicle) can be recorded or scanned. For example, the information can be recorded optically or acoustically. In one or more embodiments, the information is recorded using an optical sensor or a camera. Using the recorded information, road surface events can be determined based on their height, z, (or change in height) and respective distance, x, from the vehicle.

In one or more embodiments, the vehicle comprises a plurality of wheels. It can also comprise a front axle and a rear axle. In one or more embodiments, the vehicle can be a motor vehicle, e.g., a car or truck. The information about the oncoming road surface can be recorded and evaluated with respect to the front axle of the vehicle and/or the rear axle of the vehicle. Alternatively or additionally, the information about the road surface profile can be evaluated with respect to each individual wheel of the vehicle. For example, the suspension or damping of each wheel of the vehicle can be individually controlled depending on the profile of the oncoming road surface in front of the respective wheel.

In one or more embodiments, the recorded information about the road surface can be converted into an x-z profile, which can then be evaluated by a control unit. For example, the height (or change in height) of a variation in the road surface and the distance of the variation from the vehicle (or portions thereof, e.g., the wheels) are recorded and a signal for controlling the characteristic curve or the damping force of the vibration damping system (e.g., at least one spring element and/or damping element) is generated based on the recorded data.

In one or more embodiments, the at least one spring element and/or damping element, or the entire vibration damping system, can have a variable characteristic curve, which can be adjustable between a first characteristic curve and a second characteristic curve. For example, the first characteristic curve can be a characteristic curve causing a hard suspension while the second characteristic curve can be a characteristic curve causing a soft suspension. Of course, the vibration damping system may also be configured to switch between more than two different characteristic curves according to one or more contemplated embodiments.

In one or more embodiments, areas or events in the oncoming road surface can be classified depending on or based on their properties, including, but not limited to a maximum height (or change in height) and a length of the relevant area in the direction of travel. For example, an area of the road surface can be classified as having increasing or decreasing slopes. Alternatively or additionally, classification can be made between a short pothole, a pothole, and a large pothole when a decreasing slope followed by an increasing slope is detected. Alternatively or additionally, classification can be made between a short bump and a large bump when an increasing slope followed by a decreasing slope is detected.

In one or more embodiments, control of the damping may be customized according to the classification of the road surface event. For example, customization of the damping may take the form of adjusting the vibration damping system between hard and soft characteristic curves as the wheel encounters different portions of the detected area. For example, the vibration damping system may be controlled to have a relatively soft characteristic curve as or immediately before the wheel encounters the oncoming road surface event. The vibration damping system may be controlled to have a relatively stiff characteristic curve as the wheel passes or immediately after the wheel has passed the road surface event.

In one or more embodiments, the characteristic curve can be adjusted continuously or non-continuously. In the latter instance, the characteristic curve can be adjusted once or at discrete intervals if the profile of the road surface has certain defined properties. The adaptation of the characteristic curve can take place depending on a previously performed classification, for example, as described above. Alternatively, the characteristic curve of the damping system can be adjusted continuously. For example, the movement of the vehicle body can be predetermined or predicted based on a simplified model of the vehicle body and taking into account the recorded information about the profile of the surface of the highway in front of the vehicle in the direction of travel. The necessary damping force can be determined, for example, by using a control unit.

In one or more embodiments, the damping system can comprise a reactive control unit. An output signal of the reactive control unit can be compared with an output signal generated from the recorded information about the oncoming road surface. The necessary damping force and/or the necessary characteristic curve can be adjusted based on the result of the comparison. In some embodiments, the damping system can take into account commands from both the proactive control unit (e.g., based on the oncoming road surface) and the reactive control unit (e.g., based on forces or displacement at the wheel or vehicle body). Alternatively or additionally, the damping system may prioritize the commands from the proactive control unit over commands from the reactive control unit. For example, the vibration damping system may be switched to a soft characteristic curve setting based on a command from the proactive control unit in anticipation of an oncoming road event (e.g., a bump) even if the reactive control unit would otherwise command a hard characteristic curve.

In one or more embodiments, a device for controlling the vibration damping system can comprise a unit for recording information about the profile of the surface of the highway in front of the vehicle in the direction of travel and a device for adjusting the characteristic curve of the at least one spring element and/or damping element based on the recorded information. For example, the unit for recording the information can be a unit for acoustic or optical recording of the information. In one or more embodiments, the unit for recording the information is a camera. The device for controlling the vibration damping system can also comprise a unit for processing and evaluating recorded information. For example, the unit for processing and evaluating recorded information can classify the recorded information, as further described herein. In addition, the device for controlling the vibration damping system can comprise an activator for determining the necessary damping current, $I_{req}$, and thus the damping force to be adjusted based on signals received from the detector.

In one or more embodiments, proactive control of the vibration damping system is enabled by recording and evaluating information about the oncoming road surface. The respective damping forces can thus be adjusted in anticipation of movements of the wheels and/or vehicle body induced by the road surface and any delay in the adjustment of the characteristic curve or the necessary damping force can be minimized or at least reduced. In this manner, ride comfort and driving dynamics can be simultaneously improved. Thus, in contrast to existing semi-active damping systems that reactively respond to movements/displacements of the vehicle structure or wheels, embodiments of the disclosed subject matter enable real-time or near real-time control of the damping properties based on the approaching road profile.

Figure 1:
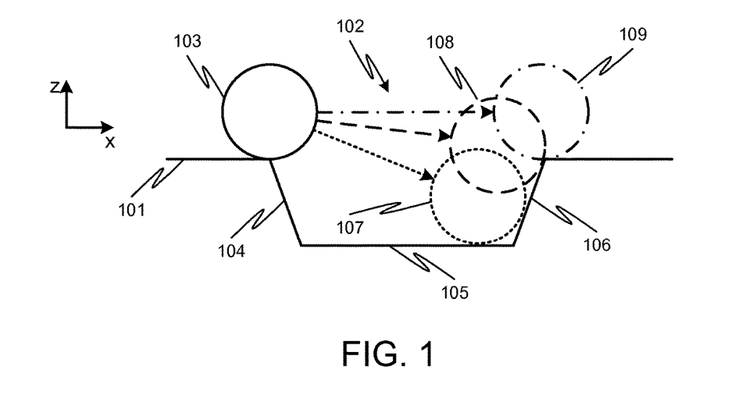
FIG. 1 is a schematic illustration of a wheel of a vehicle encountering a pothole, according to one or more embodiments of the disclosed subject matter.

FIG. 1 shows a schematic representation of a road surface 101 having a depression 102, for example, a pothole. In FIG. 1, the horizontal direction is indicated by the x axis, and the vertical direction is indicated by the z axis. The pothole 102 represents a deviation below the immediately preceding road surface and thus results in a negative change in height in the z-direction. The pothole 102 thus includes a negative slope portion 104 where the wheel first encounters the pothole, a positive slope portion 106 where the wheel leaves the pothole, and a bottom portion 105 between the slope portions 104, 106.

A wheel 103 of a vehicle (not shown) travels on the road 101 in the x direction at a speed $v_x$. As the wheel encounters pothole 102, the wheel 103 (or the vehicle) experiences an additional vertical speed component, $v_z$. The vertical speed component $v_z$ can be dependent on the vibration damping system employed by the vehicle. In the case of an active damping system, the vertical speed component $v_{z,1}$ may be zero or close to zero ($v_{z,1}=0$) such that the wheel 103 does not actually travel into the pothole 102, as shown by wheel 109 at the opposite end of pothole 102.

For a semi-active vibration damping system, the vertical speed component $v_{z,2}$ has a magnitude greater than zero. For a semi-active vibration damping system, the vertical speed of the wheel 103 can be determined and the respective characteristic curve or the damping force of the semi-active vibration damping system can be varied on the basis thereof. The wheel 103 thus falls at least some distance into the pothole 102, as illustrated by wheel 108 which impacts the positive slope portion 106 of the pothole 102. For a passive vibration damping system, the vertical speed component $v_{z,3}$ is also greater than zero, but the magnitude of the vertical speed component for a semi-active vibration damping system is less than for a passive vibration damping system ($v_{z,2} < v_{z,3}$). As a result, the wheel may impact the bottom portion 105 of the pothole and/or impact a greater portion of the positive slope 106, as shown by wheel 107.

In one or more embodiments of the disclosed subject matter, information or data about the profile of the highway is recorded in advance (e.g., on the order of seconds or milliseconds), and the recorded information or data is taken into account by a Road Load Mitigation function (RLM function). Road surface events, such as potholes or bumps, as well as other road height variations (e.g., unevenness or undulations) can be taken into account by the RLM function.

Figure 2:
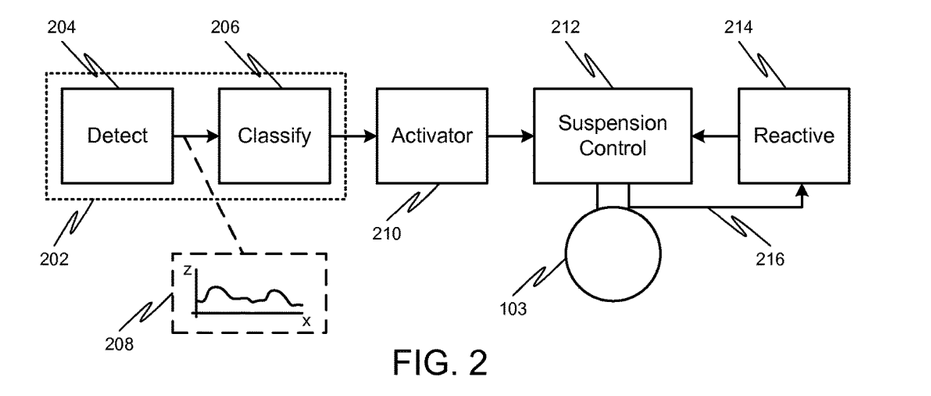
FIG. 2 is a schematic diagram of an exemplary vibration damping system, according to one or more embodiments of the disclosed subject matter.

FIG. 2 is a schematic illustration of a device for controlling a vibration damping system of a vehicle, according to one or more embodiments of the disclosed subject matter. The device comprises a road profiling unit 202 and an activator 210. The road profiling unit 202 can include a detector 204 and a classification module 206. Data or information about the profile of the surface of the highway in front of the respective vehicle can be recorded using a detector 204. For example, detector 204 can be an acoustic or optical detector, such as a camera, that records the vertical profile (e.g., height variations) of the oncoming road surface. Detector 204 may thus be disposed so as to view a surface of the road in a direction of travel of the vehicle. The detection can be disposed, for example, at the front of the vehicle or behind the windshield of the vehicle. The detector can scan the entire road surface ahead of the vehicle, or just a portion thereof, for example, a portion of the roadway along which one or more wheels of the vehicle may travel. In either case, the detector can extract the elevation profile along a projected trajectory of one or more wheels (e.g., front wheels and/or rear wheels).

For example, the detector can generate information at discrete time intervals that describes the road profile ahead of a respective wheel. The information can include elevation of each point on the road profile as ell as a corresponding longitudinal distance from the vehicle to the road profile point. The time intervals and the amount of the road profile scanned may be a function of vehicle speed. For example, the time interval and the scan area may be selected to cover a distance the vehicle will travel during the time interval. Moreover the scan area may be a function of the capabilities of the detector, e.g., based on detector range, sensitivity and/or accuracy.

The recorded data can be converted, for example, into an x-z profile 208 (i.e., elevation versus longitudinal distance from the vehicle). In the x-z profile 208, the height of the variation (i.e., unevenness) of the road surface can be plotted on the z axis and the distance of the variation from, for example, the front axle of the vehicle can be plotted on the x axis. The classification module 206 can classify the collected information with respect to the individual variations of the highway, for example, based on the x-z profile. For example, the classification module 206 can recognize patterns or specific events (e.g., positive slope, negative slope, bump, or pothole) in the road surface ahead based on the profile. Examples of possible classifications are explained in further detail below. The distance to the event as well as the length of the event may also be determined, for example, by the detector 204 using the recorded data or by the classification unit 206. Distances, lengths, and/or elevations may be determined by detector 204, for example, by processing image or acoustic data.

After evaluating the recorded data and taking into account any classification, road profiling unit 202 can generate an output signal to activator 210. The output signal may include information regarding the type of event, the distance to the event, and the length of the event. The activator 210 can receive the output signal as input and can output a damping control signal (e.g., determine a damping current, $I_{req}$, for suspension control unit 212) for a vibration damping system for wheel 103. For example, the activator 210 may set a damping current depending on the event type and length. Of course, other mechanisms for controlling damping of a vehicle suspension other than by providing a damping current are also possible according to one or more contemplated embodiments.

In response to the output signal from the road profiling unit 202, the activator 210 may select a damping level to respond to the anticipated events. The activator 210 may also be configured to calculate time points to adjust the damping, for example, based on a distance to the event, a current speed of the vehicle, and an amount of time required by the vibration damping system to make the damping adjustment.

Optionally, the activator 210 can follow preset damping protocols depending on the event classification indicated by the input signal. For example, the activator 210 may select a damping protocol depending on the event type and length. In response to the output signal from the road profiling unit 202, the activator 210 may output a damping current that follows a stored profile based on classification of the event (for example, as shown in FIGS. 7A-7G). The characteristic curve or the damping force of the vibration damping system can thus be adjusted based on the determined damping current (or determined value for damping) such that an optimal reaction to the road surface event takes place as the vehicle encounters the road surface event or immediately prior to encountering the event. The respective parameters of the road profiling unit 202 and/or the activator 210 can also be individually adjusted.

The suspension control unit 212 can include one or more damper solenoid valves of a vehicle suspension system for wheel 103. The damping provided by the vehicle suspension system can thus be adjusted by a corresponding change in electric current supplied to the damper solenoid valve. For example, a damping current, $I_{req}$, of 0.4 A may correspond to a relatively soft damping providing by the vibration damping system while a damping current, $I_{req}$, of 1.6 A may correspond to a relatively stiff damping providing by the vibration damping system. As noted above, other mechanisms for controlling damping of the vehicle suspension are also possible according to one or more contemplated embodiments.

Optionally, a reactive control system 214 may also be provided. The reactive control system 214 can receive feedback 216 from the wheel 103 or vehicle body (not shown) indicative of forces or displacement thereof. Reactive control system 214 can use feedback 216 to reactively adjust damping of the vibration damping system via an input signal to suspension control unit 212. As noted above, since the reactive control system 214 can only respond after wheel 103 encounters a particular road event, there is necessarily a delay in the adjustment of the vibration damping system in response to the event. The reactive control system 214 may thus be used to control the vibration system during times when a road event is not detected by the proactive control system, for example, where variations in the road height do not exceed a threshold level for proactive control. Alternatively or additionally, the reactive and proactive control systems may be used together, with the proactive control signal taking precedence over or supplementing the reactive control signal.

Figure 3A:
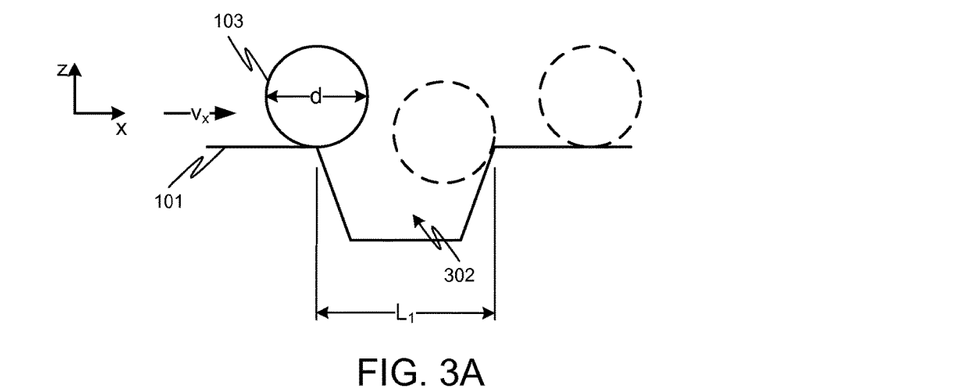
FIGS. 3A-3C are schematic illustrations of a pothole classification scenario, a long pothole classification scenario, and a short pothole classification scenario, respectively, according to one or more embodiments of the disclosed subject matter.
Figure 3B:
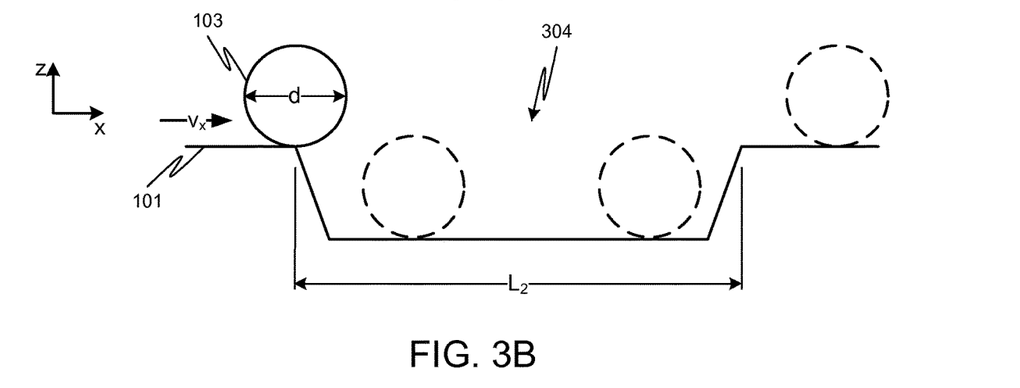
Figure 3C:
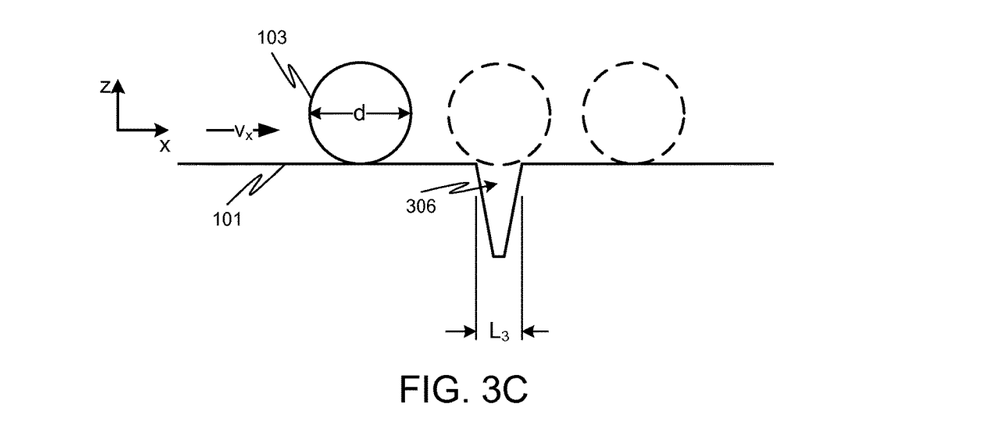

FIGS. 3A-3C show events that can be classified differently. The speed of the vehicle (of which only one front wheel 103 is shown in FIGS. 3A-3C) travelling along the road surface 101 is identified by an arrow $v_x$. In FIG. 3A, the road surface 101 has a depression 302, which has a length, $L_1$, in the direction of travel that is greater than the diameter, d, of the wheel 103. When the length $L_1$ of the depression 302 is less than a predetermined maximum threshold, $L_P$, the depression 302 can be classified as a pothole and the vibration damping system controlled according to such classification. For example, the maximum threshold length, $L_P$, may be equal to twice the diameter, d, of wheel 103, i.e., the depression 302 may be a pothole when $L_1 < L_P = 2d$.

In FIG. 3B, a depression 304 has a length, $L_2$, in the direction of travel that is greater than diameter, d, of the wheel. When the length $L_2$ of the depression is greater than the predetermined maximum threshold, $L_P$, the depression 304 may be classified as other than a pothole. For example, the depression 304 can be classified as a hollow or as a negative slope followed by a positive slope. Control of the damping characteristics of the vibration damping system for depression 304 may thus be different than that for depression 302 due to the different classification.

In FIG. 3C, a depression 306 has a length, $L_3$, in the direction of travel that is less than diameter, d, of the wheel. When the length $L_3$ of the depression is less than a predetermined minimum threshold, $L_T$, the depression 306 may be classified as other than a pothole. For example, the minimum threshold length, $L_T$, may be equal to the diameter, d, of wheel 103. For example, the depression 306 can be classified as a short pothole that does not required damping adjustment, i.e., adjustment is not needed for a depression when $L_3 < L_T = d$. Control of the damping characteristics of the vibration damping system for depression 306 may thus be different than that for depressions 302 and 304 as a result of the different classifications.

$L_P$ and $L_T$ need not be limited to the threshold lengths described above and instead may have other values according to one or more contemplated embodiments. For example, the maximum threshold, $L_P$, may be three times the diameter, d. In another example, the maximum threshold, $L_P$, and/or the minimum threshold, $L_T$, may be independent of wheel diameter, d. In still another example, the maximum threshold, $L_P$, and/or the minimum threshold, $L_T$, may be dependent on a speed of the vehicle.

Figure 4:
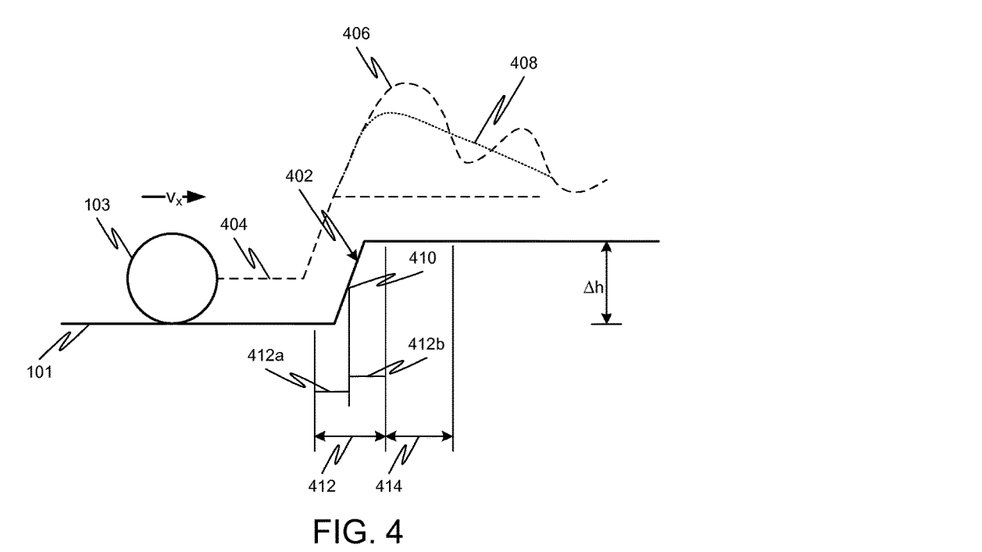
FIG. 4 is a schematic illustration of a wheel impacting a rise in the road and adjustment of a vibration damping system, according to one or more embodiments of the disclosed subject matter.

Referring to FIG. 4, an example of adjustment or adaptation of the characteristic curve or the damping force of the vibration damping system is illustrated. In FIG. 4, an event in the road surface 101 is illustrated, for example, as a rise 402 (e.g., positive slope), which has a height, $\Delta h$, and a corresponding sloping profile. The height, $\Delta h$, and the profile of the rise 402 can be determined, for example, from information obtained using a camera before the vehicle or the wheel 103 reaches the rise 402.

The vehicle can have a semi-active vibration damping system whose characteristic curve can be variably adjusted between a relatively hard or stiff damping mode and a relatively soft damping mode. For example, the hard vibration damping mode can be characterized by a maximum possible damping force while the soft damping mode can be characterized by a minimum possible damping force. The vibration damping system can thus be operated in either a first damping mode (e.g., the hard damping mode) or a second damping mode (e.g., the soft damping mode). However, the first and second damping modes need not correspond to the maximum and minimum damping forces provided by the vibration damping system. Rather, damping modes other than the maximum and minimum damping forces can be used so long as one of the damping modes is relatively harder than the other.

For example, certain predefined vibration damping schemas can be employed through activator 210 depending on the previously recorded and classified profile of the highway. As illustrated in FIG. 4, the vibration damping system can be set to have the second damping characteristic curve (e.g., the soft damping mode) during a first period 412. The first period 412 can begin before the wheel 103 (which follows path 404) reaches the rise 402 and while the wheel 103 interacts with the slope of the rise 402. Thus, the first period 412 includes a pre-impact period 412*a*, where the wheel has not yet made contact with rise 402, and a hold period 412*b*, where the wheel has made contact with rise 402. Indeed, hold period 412*b* can extend after the wheel 103 has passed the rise 402. At a point after the first period 412, the vibration damping system can be set to have the first damping characteristic curve (e.g., the hard damping mode) during an aftershock period 414, which may be a period after the wheel 103 passes the rise 402 but may still experience an effect from the rise 402 (e.g., oscillations or a displacement from the road surface). The vibration damping system can return to normal damping operation (e.g., controlled by the reactive control system) post aftershock period 414.

The point of the rise 402 at which wheel 103 reaches the slope of the rise 402 (i.e., where the wheel 103 first contacts the rise 402) is the point of detection 410, which may be used to determine the start and/or end of first period 412. For example, point 410 can serve as a spatial center line for the region 412 in which the second characteristic curve is applied. Alternatively, point 410 can indicate a start of region 412. In yet another alternative, first period 412 may start at a given time (e.g., on the order of milliseconds) before point 410. However, the start and/or end points for the first period 412 can also be determined in other ways according to one or more contemplated embodiments.

The point of detection 410 may be determined using the data from road profiling unit 202. In some embodiments, the height, $\Delta h$, of the event and/or the point of detection 410 may be compared to a threshold to determine if the event warrants proactive control. For example, where $\Delta h$ is small or the point of detection is close to a level of the current road surface, control of the damping may not be necessary. This threshold value may be determined, for example, via experiment and/or calibration.

The dotted line 404 represents the path traversed by the center of the wheel 103 as it travels to rise 402. If the vibration damping system were maintained with the second characteristic curve (i.e., soft damping) after interaction with the rise 402, the wheel would follow curve 406. In contrast, if the vibration damping system were maintained with the first characteristic curve (i.e., hard damping) after interaction with the rise 402, the wheel would follow curve 408. Thus, applying the second characteristic curve (i.e., soft damping) after passing the rise 402 may cause larger oscillations as compared to the use of the first characteristic curve (i.e., hard damping). It may be desirable to avoid such large oscillations by switching from the softer characteristic curve during period 412 to the harder characteristic curve during period 414. Thus, the impact of the rise 402 may be more readily absorbed by the soft damping mode during interaction of the wheel 103 with rise 402 while allowing more stable contact and reduction in oscillation immediately after the rise 402 by the hard damping mode.

Figure 5:
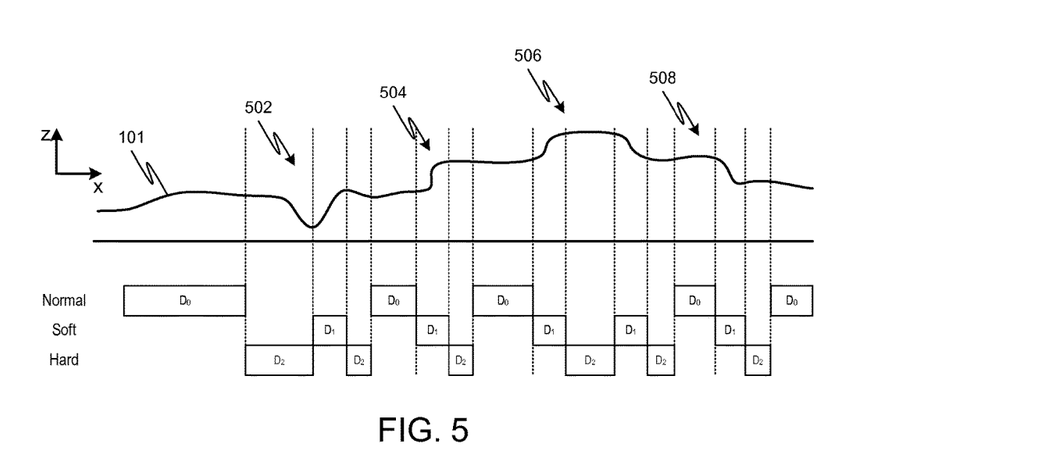
FIG. 5 is a schematic illustration of a road profile and damping adjustments responsive to the road profile, according to one or more embodiments of the disclosed subject matter.
Figure 6:
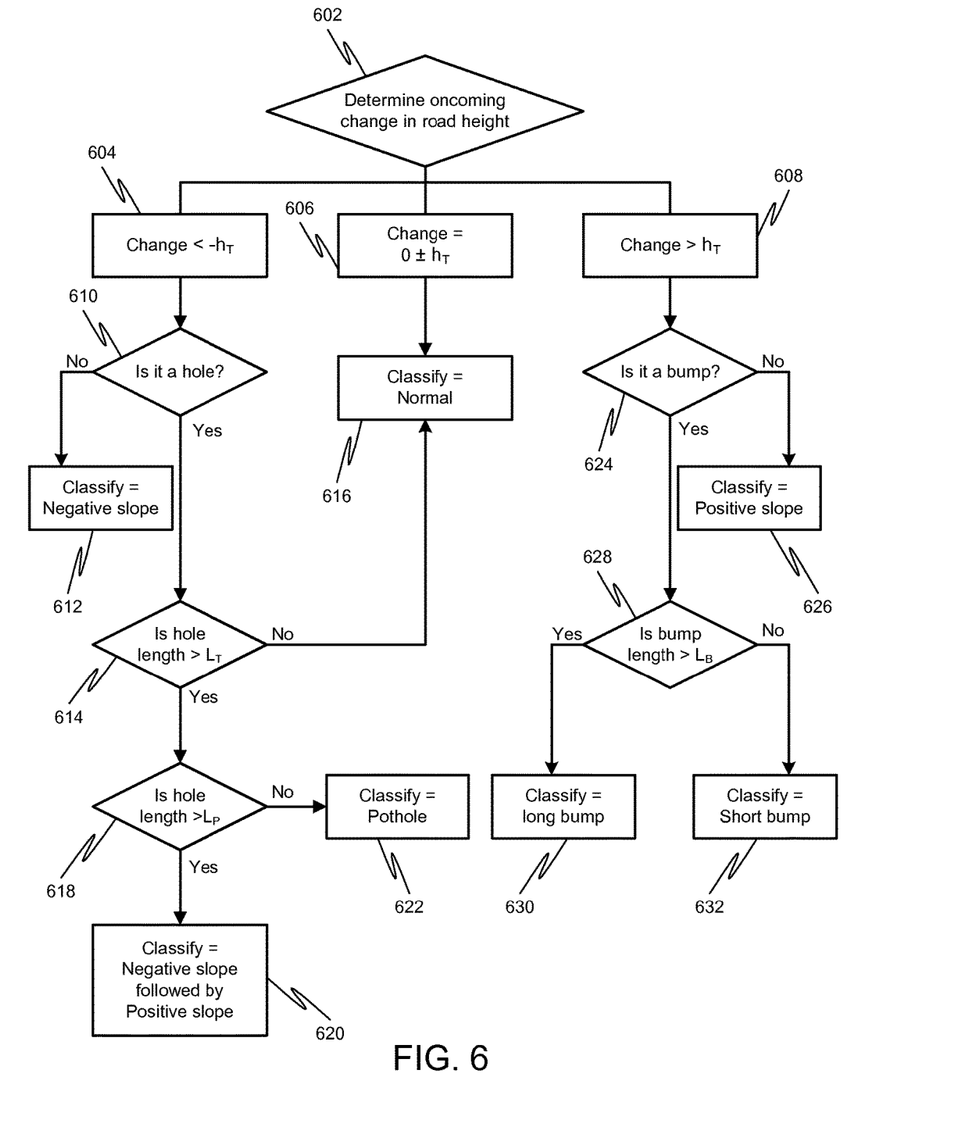
FIG. 6 is a simplified flow diagram of an exemplary classification scheme, according to one or more embodiments of the disclosed subject matter.

FIG. 5 illustrates how damping control by the activator 210 can be applied to various events in a road surface. An x-z profile of the road surface 101 is illustrated, which profile can be recorded (for example, using a camera) and classified in relation to individual sections of the roadway based on the events. For example, event 502 can be classified as a pothole. Event 504 can be classified as a positive slope, and event 508 can be classified as a negative slope. Event 506 can be classified as a bump (or hump). At the bottom of FIG. 5, corresponding damping modes are illustrated, where $D_0$ represents a normal damping mode, $D_2$ represents a relatively hard damping mode (e.g., first characteristic curve), and $D_1$ represents a relatively soft damping mode (e.g., second characteristic curve). For example, during the normal damping mode, the vibration damping system may be controlled according to reactive control schemes, with a damping value set responsively to forces and/or displacement of the wheel and being between a minimum damping value and a maximum damping value. Classification schemes and damping modes responsive to the classification schemes are discussed in more detail below, FIG. 6 illustrates a flow diagram for classification of road events according to one or more embodiments of the disclosed subject matter. At 602, it may be determined whether there is an oncoming change in height in the road surface. For example, the determination may be performed by classification module 206 based on information or data (e.g., a plot of road elevation versus distance) received from detector 204. In some embodiments, the height, $\Delta h$, of the event and/or the point of detection may be compared to a threshold, $h_T$, to determine if the event warrants proactive control. For example, where comparison 606 reveals that $\Delta h$ is too small (e.g., $\Delta h \leq \pm h_T$) proactive control of the damping may not be necessary and thus the surface or event may be classified as normal.

When the change in height is determined to be negative (or when a threshold is used and $\Delta h<-h_T$) at 604, classification module 206 can then determine if the event can be considered a hole (or depression) at 610. For example, the determination at 610 may take into account whether a negative change in height is followed by a corresponding positive change in height within a given distance of travel. If it is determined at 610 that the event is not a hole, classification module 206 can classify the event as a negative slope at 612. An output signal can be generated based on the negative slope classification for controlling the vibration damping system, as discussed in further detail with respect to FIG. 7D.

If it is determined at 610 that the event is a hole, classification module 206 can proceed to compare a length of the hole to certain thresholds. If the length of the hole exceeds a minimum threshold, $L_T$, at 614, the classification module 206 can further compare the length of the hole to a maximum threshold, $L_P$, at 618. If the length of the hole exceeds the maximum threshold, $L_P$, then the hole can be classified by the classification module as a negative slope followed by a positive slope at 620. An output signal can be generated based on the classification at 620 for controlling the vibration damping system, as discussed in further detail with respect to FIG. 7C.

If the length of the hole exceeds the minimum threshold, $L_T$, at 614 and is less than the maximum threshold, $L_P$, at 618, then the hole can be classified by the classification module as a pothole at 622. An output signal can be generated based on the pothole classification for controlling the vibration damping system, as discussed in further detail with respect to FIG. 7A. Otherwise, if the length of the hole is less than the minimum threshold, $L_T$, at 614, the classification module considers this as too short of a pothole for damping control and thus classifies the hole as normal at 616. For example, classification module 206 can refrain from providing a control signal based on the classification at 616, instead allowing reactive control system 214 to control suspension control 212 in its normal manner.

When the change in height is determined to be positive (or when a threshold is used and $\Delta h>h_T$) at 608, classification module 206 can determine if the event can be considered a bump (or a hump) at 624. For example, the determination at 624 may take into account whether a positive change in height is followed by a corresponding negative change in height within a given distance of travel. If it is determined at 624 that the event is not a bump, classification module 206 can classify the event as a positive slope at 626. An output signal can be generated based on the positive slope classification for controlling the vibration damping system, as discussed in further detail with respect to FIG. 7E.

If it is determined at 624 that the event is a bump, classification module 206 can proceed to compare a length of the bump to a threshold. If the length of the bump exceeds a threshold, $L_B$, then the bump can be classified by the classification module as a long bump at 630. An output signal can be generated based on the classification at 630 for controlling the vibration damping system, as discussed in further detail with respect to FIG. 7G. Otherwise, if the length of the bump is less than or equal to a threshold, $L_B$, then the bump can be classified by the classification module as a short bump at 632. An output signal can be generated based on the classification at 632 for controlling the vibration damping system, as discussed in further detail with respect to FIG. 7F.

Figure 7A:
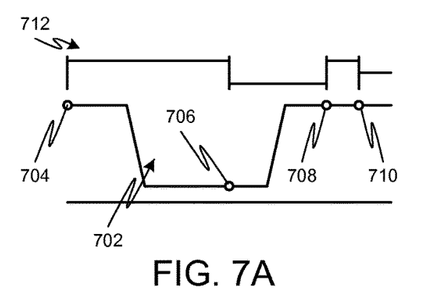
FIGS. 7A-7G are schematic illustrations of a pothole, short pothole, long pothole, negative slope, positive slope, short bump, and long bump classifications, respectively, and corresponding damping control according to one or more embodiments of the disclosed subject matter.

Turning to FIGS. 7A-7G, exemplary damping control schemes are shown for various road surface event classifications. For example, FIG. 7A illustrates an event 702 that has been classified as a pothole and a corresponding damping control scheme 712. When the wheel (e.g., a front of the wheel, a center of the wheel, or some other part of the vehicle) reaches a point 704 before the pothole 702, the damping of the vibration damping system can be set to have a relatively hard damping (e.g., a first characteristic curve corresponding to a current for damper solenoid valves of 1.6 A), for example, by an output signal from the activator. The relatively hard damping may minimize or at least reduce the amount a wheel may fall into the pothole 702, thereby minimizing or at least reducing an amount of contact between the wheel and the opposite end of the pothole 702.

The relatively hard damping setting can be maintained until a point 706 prior to an end of the pothole 702. At point 706, the damping of the vibration damping system can be set to have a relatively soft damping (e.g., a second characteristic curve corresponding to a current for damper solenoid valves of 0.4 A), for example, by an output signal from the activator. The relatively soft damping toward the end of the pothole 702 can allow the damping system to better absorb the impact of the wheel with the opposite end of the pothole. The relatively soft damping setting can be maintained until a point 708 after the pothole 718. For example, point 708 may represent a point where the wheel no longer contacts pothole 702.

At point 708, the damping of the vibration damping system can be set to have a relatively hard damping (e.g., a first characteristic curve corresponding to a current for damper solenoid valves of 1.6 A). The relatively hard damping setting can be maintained until a point 710, after which normal damping control (e.g., having a damping value between the relatively hard and relatively soft, as set by the reactive control unit 214) may resume. The relatively hard damping setting between points 708 and 710 may serve to inhibit vertical oscillations of the wheel that may otherwise occur with the relatively soft damping setting.

The precise location of points 704, 706, 708, and 710 with respect to pothole 702 may be a function of vehicle speed and vibration damping system response times, among other things. In one or more embodiments, the location of points 704, 706, 708, and 710 can be optimized based on simulations or experimentation.

Figure 7B:
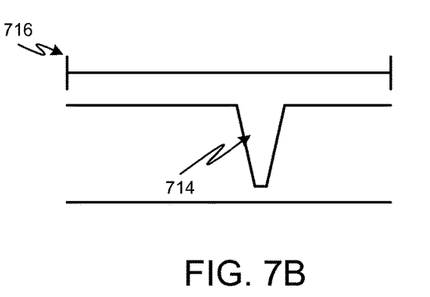

FIG. 7B illustrates an event 714 that has been classified as a small pothole and a corresponding damping control scheme 716. Because the pothole 714 has a length less than a predetermined threshold, adjustment of the damping of the vibration damping system is determined to be unnecessary. As a result normal damping control (e.g., having a damping value between the relatively hard and relatively soft, as set by the reactive control unit 214) may be maintained before, during, and after pothole 714.

Figure 7C:
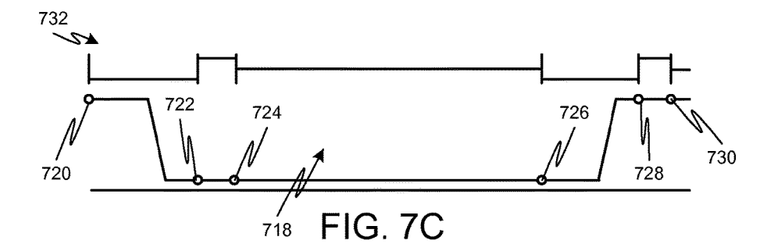

FIG. 7C illustrates an event 718 that has been classified as a large pothole and a corresponding damping control scheme 732. Because the pothole 718 has a length larger than a predetermined threshold, the initial end of the pothole 718 can be treated as a negative slope while the terminal end of the pothole 718 can be treated as a positive slope.

When the wheel (e.g., a front of the wheel, a center of the wheel, or some other part of the vehicle) reaches a point 720 before the pothole 718, the damping of the vibration damping system can be set to have a relatively soft damping (e.g., a second characteristic curve corresponding to a current for damper solenoid valves of 0.4 A), for example, by an output signal from the activator. The relatively soft damping can allow the wheel to resume contact with the road (i.e., the bottom of the pothole 718) more quickly. The relatively soft damping setting can be maintained until a point 722 after the negative slope at the initial end of the pothole 718. For example, point 722 may represent a point where the wheel no longer contacts the negative slope of the pothole 718.

At point 722, the damping of the vibration damping system can be set to have a relatively hard damping (e.g., a first characteristic curve corresponding to a current for damper solenoid valves of 1.6 A). The relatively hard damping setting can be maintained until a point 724, after which normal damping control (e.g., having a damping value between the relatively hard and relatively soft, as set by the reactive control unit 214) may resume. The relatively hard damping setting between points 722 and 724 may serve to inhibit vertical oscillations of the wheel that may otherwise occur with the relatively soft damping setting.

When the wheel (e.g., a front of the wheel, a center of the wheel, or some other part of the vehicle) reaches a point 726 before the positive slope of pothole 718, the damping of the vibration damping system can again be set to have a relatively soft damping (e.g., a second characteristic curve corresponding to a current for damper solenoid valves of 0.4 A), for example, by an output signal from the activator. The relatively soft damping toward the end of the pothole 718 can allow the damping system to better absorb the impact of the wheel with the terminal end of the pothole. The relatively soft damping setting can be maintained until a point 728 after the positive slope at the terminal end of the pothole 718. For example, point 728 may represent a point where the wheel no longer contacts the positive slope of the pothole 718.

At point 728, the damping of the vibration damping system can be set to have a relatively hard damping (e.g., a first characteristic curve corresponding to a current for damper solenoid valves of 1.6 A). The relatively hard damping setting can be maintained until a point 730, after high normal damping control (e.g., having a damping value between the relatively hard and relatively soft, as set by the reactive control unit 214) may resume. The relatively hard damping setting between points 728 and 730 may serve to inhibit vertical oscillations of the wheel that may otherwise occur with the relatively soft damping setting.

The precise location of points 720, 722, 724, 726, 728, and 730 with respect to pothole 718 may be a function of vehicle speed and vibration damping system response times, among other things. In one or more embodiments, the location of points 720, 722, 724, 726, 728, and 730 can be optimized based on simulations or experimentation.

Figure 7D:
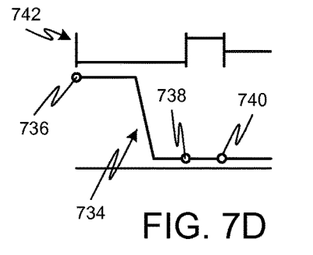

FIG. 7D illustrates an event 734 that has been classified as a negative slope and a corresponding damping control scheme 742. When the wheel (e.g., a front of the wheel, a center of the wheel, or some other part of the vehicle) reaches a point 736 before the slope 734, the damping of the vibration damping system can be set to have a relatively soft damping (e.g., a second characteristic curve corresponding to a current for damper solenoid valves of 0.4 A), for example, by an output signal from the activator. The relatively soft damping can allow the wheel to resume contact with the road (i.e., the road after slope 734) more quickly. The relatively soft damping setting can be maintained until a point 738. For example, point 738 may represent a point where the wheel no longer contacts the negative slope 734.

At point 738, the damping of the vibration damping system can be set to have a relatively hard damping (e.g., a first characteristic curve corresponding to a current for damper solenoid valves of 1.6 A) The relatively hard damping can be maintained until a point 740, after which normal damping control (e.g., having a damping value between the relatively hard and relatively soft, as set by the reactive control unit 214) may resume. The relatively hard damping setting between points 738 and 740 may serve to inhibit vertical oscillations of the wheel that may otherwise occur with the relatively soft damping setting.

The precise location of points 736, 738, and 740 with respect to slope 734 may be a function of vehicle speed and vibration damping system response times, among other things. In one or more embodiments, the location of points 736, 738, and 740 can be optimized based on simulations or experimentation.

Figure 7E:
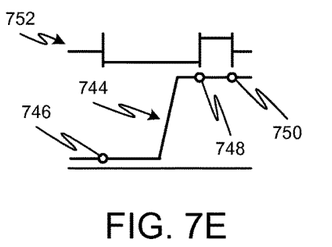

FIG. 7E illustrates an event 744 that has been classified as a positive slope and a corresponding damping control scheme 752. When the wheel (e.g., a front of the wheel, a center of the wheel, or some other part of the vehicle) reaches a point 746 before the positive slope 744, the damping of the vibration damping system can be set to have a relatively soft damping (e.g., a second characteristic curve corresponding to a current for damper solenoid valves of 0.4 A), for example, by an output signal from the activator. The relatively soft damping can allow the damping system to better absorb the impact of the wheel with the positive slope 744. The relatively soft damping setting can be maintained until a point 748 after the positive slope 744. For example, point 748 may represent a point where the wheel no longer contacts the positive slope 744.

At point 748, the damping of the vibration damping system can be set to have a relatively hard damping (e.g., a first characteristic curve corresponding to a current for damper solenoid valves of 1.6 A). The relatively hard damping setting can be maintained until a point 750, after which normal damping control (e.g., having a damping value between the relatively hard and relatively soft, as set by the reactive control unit 214) may resume. The relatively hard damping setting between points 748 and 750 may serve to inhibit vertical oscillations of the wheel that may otherwise occur with the relatively soft damping setting.

The precise location of points 746, 748, and 750 with respect to positive slope 744 may be a function of vehicle speed and vibration damping system response times, among other things. In one or more embodiments, the location of points 746, 748, and 750 can be optimized based on simulations or experimentation.

Figure 7F:
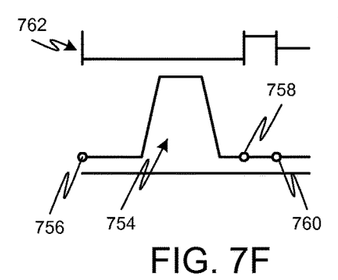

FIG. 7F illustrates an event 754 that has been classified as a short bump and a corresponding damping control scheme 762. When the wheel (e.g., a front of the wheel, a center of the wheel, or some other part of the vehicle) reaches a point 756 before the bump 754, the damping of the vibration damping system can be set to have a relatively soft damping (e.g., a second characteristic curve corresponding to a current for damper solenoid valves of 0.4 A), for example, by an output signal from the activator. The relatively soft damping can allow the damping system to absorb the impact with the positive slope of the bump as well as allow the wheel to resume contact with the road (i.e., the road after bump 754) more quickly. The relatively soft damping setting can be maintained until a point 758. For example, point 758 may represent a point where the wheel no longer contacts the bump 754.

At point 758, the damping of the vibration damping system can be set to have a relatively hard damping (e.g., a first characteristic curve corresponding to a current for damper solenoid valves of 1.6 A), for example, by an output signal from the activator. The relatively hard damping setting can be maintained until point 760, after which normal damping control (e.g., having a damping value between the relatively hard and relatively soft, as set by the reactive control unit 214) may resume. The relatively hard damping setting between points 758 and 760 may serve to inhibit vertical oscillations of the wheel that may otherwise occur with the relatively soft damping setting.

The precise location of points 756, 758, and 760 with respect to slope 754 may be a function of vehicle speed and vibration damping system response times, among other things. In one or more embodiments, the location of points 756, 758, and 760 can be optimized based on simulations or experimentation.

Figure 7G:
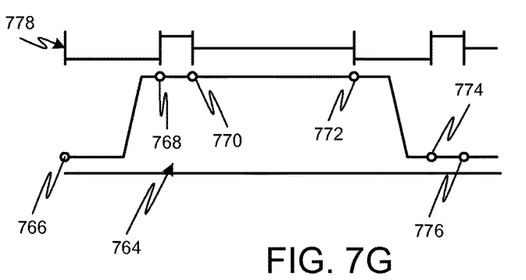

FIG. 7G illustrates an event 764 that has been classified as a long bump and a corresponding damping control scheme 778. Because the bump has a length larger than a predetermined threshold, the initial end of the bump 764 can be treated as a positive slope while the terminal end of the bump 764 can be treated as a negative slope.

When the wheel (e.g., a front of the wheel, a center of the wheel, or some other part of the vehicle) reaches a point 766 before the bump 764, the damping of the vibration damping system can be set to have a relatively soft damping (e.g., a second characteristic curve corresponding to a current for damper solenoid valves of 0.4 A), for example, by an output signal from the activator. The relatively soft damping can allow the damping system to absorb the impact with the positive slope of the bump. The relatively soft damping setting can be maintained until a point 768 after the positive slope of bump 764. For example, point 768 may represent a point where the wheel no longer contacts the positive slope of the bump 764.

At point 768, the damping of the vibration damping system can be set to have a relatively hard damping (e.g., a first characteristic curve corresponding to a current for damper solenoid valves of 1.6 A). The relatively hard damping setting can be maintained until a point 770, after which normal damping control (e.g., having a damping value between the relatively hard and relatively soft, as set by the reactive control unit 214) may resume. Alternatively, the region between points 770 and 772 can be maintained at the relatively higher damping level, such that the relatively higher damping level is effective from point 768 to point 772. The relatively hard damping setting between points 768 and 770 (or 772) may serve to inhibit vertical oscillations of the wheel that may otherwise occur with the relatively soft damping setting.

When the wheel (e.g., a front of the wheel, a center of the wheel, or some other part of the vehicle) reaches a point 772 before the negative slope of bump 764, the damping of the vibration damping system can again be set to have a relatively soft damping (e.g., a second characteristic curve corresponding to a current for damper solenoid valves of 0.4 A), for example, by an output signal from the activator. The relatively soft damping toward the end of the bump 764 can allow the wheel to resume contact with the road (i.e., the road after bump 764) more quickly. The relatively soft damping setting can be maintained until a point 774 after the negative slope at the terminal end of the bump 764. For example, point 774 may represent a point where the wheel no longer contacts the negative slope of the bump 764.

At point 774, the damping of the vibration damping system can be set to have a relatively hard damping (e.g., a first characteristic curve corresponding to a current for damper solenoid valves of 1.6 A). The relatively hard damping setting can be maintained until a point 776, after which normal damping control (e.g., having a damping value between the relatively hard and relatively soft, as set by the reactive control unit 214) may resume. The relatively hard damping setting between points 774 and 776 may serve to inhibit vertical oscillations of the wheel that may otherwise occur with the relatively soft damping setting.

The precise location of points 766, 768, 770, 772, 774, and 776 with respect to bump 764 may be a function of vehicle speed and vibration damping system response times, among other things. In one or more embodiments, the location of points 766, 768, 770, 772, 774, and 776 can be optimized based on simulations or experimentation.

The classification may be based on patterns and road event forms other than those explicitly described above. For example, the classification and corresponding damping control may be based on road events that have a sinusoidal shape, a triangular shape, or any other shape. Moreover, road events can be classified according to a best fit classification and need not exactly fit one of the patterns explicitly described above. Road events can also be classified as a combination of one or more profiles. Thus, a sinusoidal road variation with a peak followed by a valley may be classified as a bump followed by pothole. Accordingly, embodiments of the disclosed subject matter are not limited to the specific profiles and classifications described herein.

The method described above can be performed in one or more devices of the vehicle. For example, the method can be performed by a control device of the suspension system such as a central control unit (not shown) or controller. The control device can be implemented within any element of the suspension system such as a control unit. Alternatively, the control device can be a separate device from any of the above-described suspension system elements.

The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A method for controlling a vibration damping system of a vehicle, comprising:
   detecting a profile of a road surface with a sensor;
   identifying an upcoming change in height of a portion of the detected road surface;
   determining whether the change in height meets or exceeds a threshold;
   if the change in height meets or exceeds the threshold, selecting a road surface profile classification from a plurality of predetermined classifications stored in an electronic memory, based on the change in height of the detected road surface profile; and
   adjusting a damping force of the damping system based on the selected classification by setting a characteristic curve of the damping system to have a maximum value of damping prior to and during a first period corresponding to interaction of a wheel of the vehicle with a leading edge of the portion of the detected road surface and setting the characteristic curve to have a minimum value of damping prior to and during a second period after the first period and corresponding to interaction of the wheel of the vehicle with a trailing edge of the portion of the detected road surface.

2. The method of claim 1, wherein the selecting includes identifying the portion of the road surface profile as one of a pothole, a short pothole, a positive slope, a negative slope, a short bump, a long bump, or normal road.

3. The method of claim 1, further comprising setting the characteristic curve to have a value between said minimum and maximum values after the second period.

4. The method of claim 1, wherein adjusting the damping force is performed when or immediately prior to a portion of the vehicle reaching a position of the road surface corresponding to the portion of the detected road surface profile.

5. The method of claim 1, wherein the detecting a profile of a road surface comprises detecting the profile of the road surface with an optical or acoustic sensor.

6. The method of claim 1, wherein detecting comprises using an optical sensor or camera to acquire the road surface profile.

7. The method of claim 1, wherein detecting a profile of a road surface comprises determining respective changes in height, z, and distances from the vehicle, x, of points of the profile of the road surface.

8. The method of claim 7, further comprising generating an x-z profile of the detected road surface profile based on the changes in height z and distances from the vehicle x for evaluation by a control unit.

9. The method of claim 1, wherein adjusting the damping force of the damping system further comprises adjusting the characteristic curve of the damping system between the maximum value of damping and the minimum value of damping after the second period.

10. The method of claim 1, further comprising repeating the detecting, selecting, and adjusting steps.

11. The method of claim 1, wherein adjusting the damping force further includes adjusting the characteristic curve of the damping system by:
   predicting movement of a body of the vehicle using a simplified model of the vehicle body based on the detected road surface profile;
   determining a necessary damping force based on the predicted movement; and
   adjusting the characteristic curve to provide at least the necessary damping force.

12. The method of claim 1, wherein the vibration damping system comprises a reactive control unit, and wherein adjusting the damping force comprises:

comparing an output signal of the reactive control unit to an output signal that is generated based on the detected road surface profile; and adjusting the damping force and/or a characteristic curve of the damping system based on the comparison.

13. The method of claim 1, wherein the vibration damping system comprises at least one spring element and/or damping element.

14. The method of claim 1, wherein if the change in height does not meet the threshold, the road surface profile is classified as normal.

15. A vehicle vibration damping system comprising:
a sensor configured to detect information about a profile of a road surface in front of a vehicle; and
at least one controller operatively coupled to the sensor and configured to classify at least a portion of the road surface profile in one of a plurality of road surface profile classifications based on a comparison of at least one of detected height and length features of the profile to at least one of predetermined height and length thresholds, respectively, the at least one controller further configured to adjust damping responsively to the classification of the profile by setting a characteristic curve of the damping system to have a maximum value of damping prior to and during a first period corresponding to interaction of a wheel of the vehicle with a leading edge of the portion of the road surface profile and setting the characteristic curve to have a minimum value of damping prior to and during a second period after the first period and corresponding to interaction of the wheel of the vehicle with a trailing edge of the portion of the road surface profile.

16. The system of claim 15, wherein the at least one controller is configured to designate the portion of the road surface profile as one of a pothole, a short pothole, a positive slope, a negative slope, a short bump, a long bump, or normal road, and an activator is configured to determine a necessary damping current or damper/force level based on signals from the at least one controller indicative of the designation.

17. The system of claim 15, wherein the at least one controller is configured to adjust damping between a maximum value and a minimum value.

18. The system of claim 15, further comprising at least one spring element and/or damping element including one or more damper solenoid valves that sets the characteristic curve, the at least one controller being configured to adjust a characteristic curve of the at least one spring element and/or damping element by sending a current to the damper solenoid valves.

19. The system of claim 15, wherein the sensor comprises an optical sensor or an acoustic sensor.

20. The system of claim 15, further comprising a reactive controller operatively coupled to the at least one spring element and/or damping element, the reactive controller being configured to adjust the characteristic curve of the at least one spring element and/or damping element responsively to forces or displacements of a body or wheel of the vehicle.

21. A vehicle vibration damping system comprising:
a controller operatively coupled to a variable damping system, The controller being configured to:
receive signals regarding detection of at least one of height and length features of a profile of a road surface in front of a vehicle;
compare at least a portion of the road surface profile based on the detected height or length features of the profile to respective predetermined height and length thresholds stored in an electronic memory operatively associated with the at least one controller;
classify at least the portion of the road surface profile based on the comparison; and
modify, a damping force of the damping system based on classified portion of the road surface profile by setting a characteristic curve of the damping system to have a maximum value of damping prior to and during a first period corresponding to interaction of wheel of the vehicle with a leading edge of the portion of the road surface profile and setting the characteristic curve to have a minimum value of damping prior to and during a second period after the first period and corresponding to interaction of the wheel of the vehicle with a trailing edge of the portion of the road surface profile.

22. The system of claim 21, wherein the controller is configured to designate the portion of the road surface profile as one of a pothole, a short pothole, a positive slope, a negative slope, a short bump, a long bump, or normal road.

23. The damping system of claim 21, wherein the predetermined height and length thresholds are based at least partly on a diameter of a wheel of the vehicle.

* * * * *